Aug. 2, 1955   T. F. STACY ET AL   2,714,225
MOLDING PRESS
Filed June 15, 1950   2 Sheets-Sheet 1

INVENTORS
Thomas F. Stacy
Elmer John von der Heide
BY
Parker, Erchman & Farmer,
Attorneys.

Aug. 2, 1955     T. F. STACY ET AL     2,714,225
MOLDING PRESS
Filed June 15, 1950     2 Sheets-Sheet 2
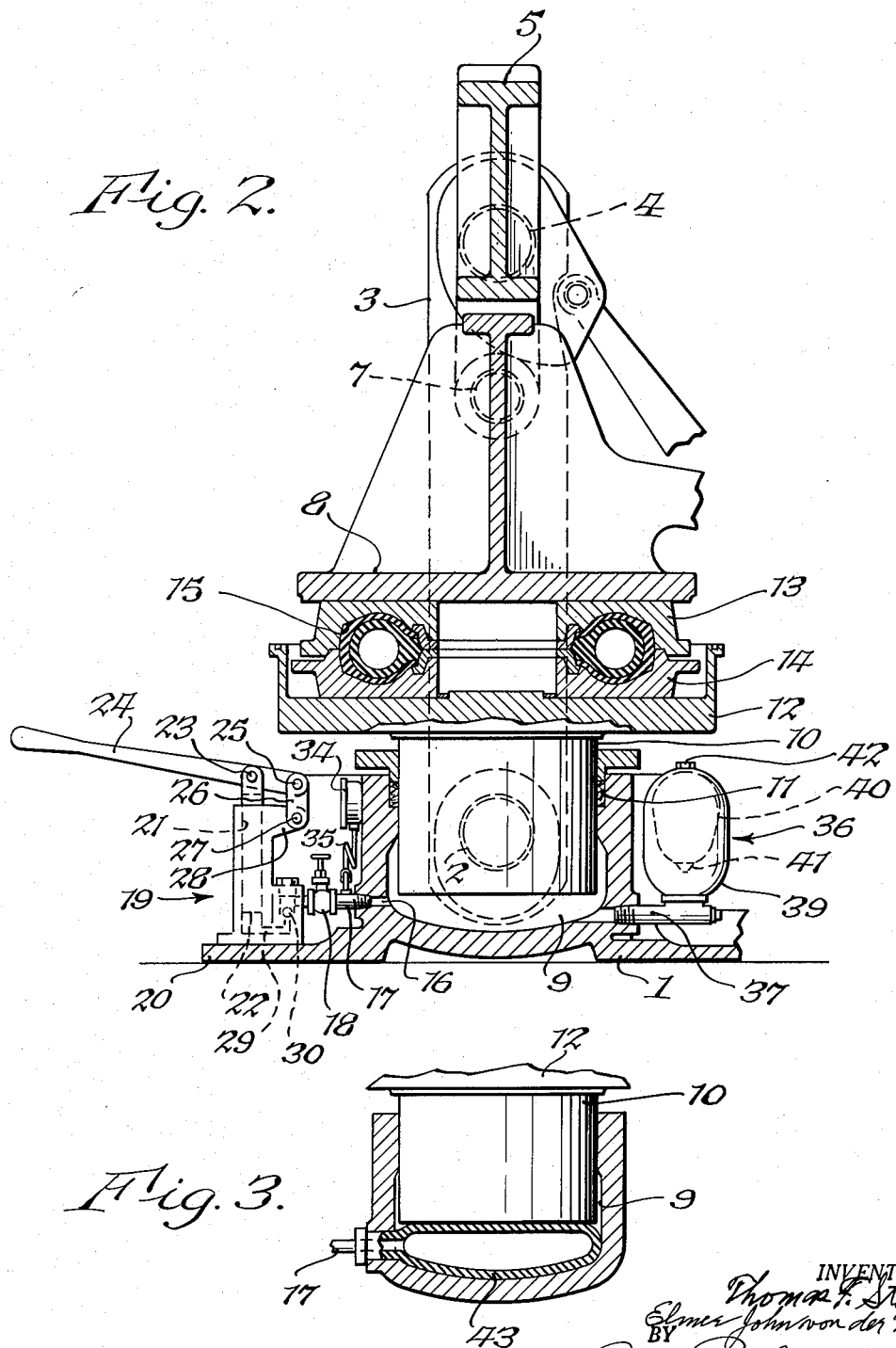

United States Patent Office 2,714,225
Patented Aug. 2, 1955

2,714,225

MOLDING PRESS

Thomas F. Stacy, Piqua, and Elmer John von der Heide, Hudson, Ohio, assignors to The French Oil Mill Machinery Company, Piqua, Ohio Application June 15, 1950, Serial No. 168,178

1 Claim. (Cl. 18—17)

This invention relates to molding presses of the mechanically closing type, and more particularly to those using a toggle action in the closing and opening of the press. Presses of this type have recently been coming into common use because they operate without a continuous source of hydraulic pressure requiring power operated pumps. This is a definite advantage because power units are expensive and require considerable maintenance. Presses of this type heretofore have employed one or more screws in order to adjust one of the platens carrying one of the mold parts toward and from the other platen, because the mold on the adjustable platen must be adjusted to exactly the correct height in order that the required mold pressure will be developed as the press is closed. In any toggle mechanism the maximum pressure is developed only when the toggle has been completely straightened out, and the pressure which the mechanism will develop drops off very rapidly when the toggle center point is moved away from the center portion, which makes it necessary to provide for adjustment of relatively stationary mold section.

An object of this invention is to provide an improved molding press with which the relatively stationary mold, and the platen which mounts it, may be adjusted to exactly the right height for that mold in order to develop the desired closing pressure, which will operate without continuous hydraulic power, which will have all of the advantages of the toggle closing type of press, which may be easily adjusted to set the relatively stationary mold at a selected height when the molds are changed, which will require a minimum of maintenance cost and attention, and which will be relatively simple, practical and inexpensive.

Another object of the invention is to provide an improved and simplified molding press of the mechanically closing type, which may be easily and quickly adjusted to operate with different molds, and which is relatively self-contained except for the power required to open and close the press.

Other objects and advantages will be apparent from the following description of some embodiments of the invention, and the novel features will be particularly pointed out hereinafter in connection with the appended claim.

In the accompanying drawing:

Fig. 2 is a transverse, sectional elevation through the same; and

Fig. 3 is a sectional elevation of a portion of the mechanism shown in Fig. 2, but illustrating a modification thereof.

Figure 1:
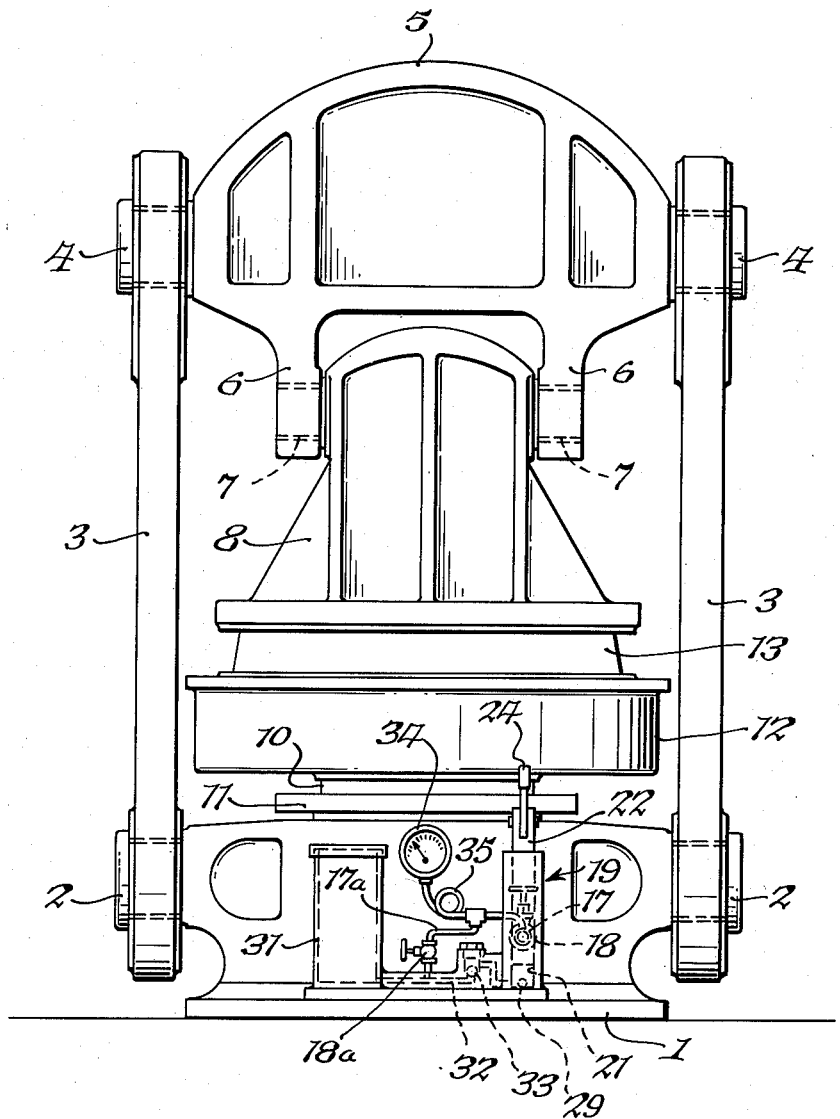
Fig. 1 is a front elevation of a press constructed in accordance with this invention.

In the embodiment of the invention illustrated in Figs. 1 and 2, the press includes a base 1 having axially alined, pivotal studs or bearings 2 at opposite ends thereof, on which are rockably mounted the lower ends of upstanding links 3. The links 3 are parallel to each other, and their upper ends are pivoted on axially alined pivot studs 4 which are carried on opposite ends of a beam 5 that extends above and is spaced from the base 1. Axially alined bearing lugs 6 depend from the lower edge of the beam 5, in parallel, spaced relation to each other and receive and rotatably support studs 7 that extend from opposite sides of an upper platen 8. The upper platen 8 thus is suspended from the beam 5 which is, in turn, pivotally supported by the upper ends of the rockable links 3. The links 3 and beam 5 support the upper platen 8 in spaced relation above the base 1, and the links 3, beam 5 and platen 8 form a toggle to open and close the press. Presses of this type are well known, but one is illustrated, for example, in U. S. Patent No. 2,358,762.

Provided in the base 1, Fig. 2, is a hydraulic ram cylinder 9, open at its upper end. Telescoping into and reciprocating vertically within the cylinder 9 is a piston 10. A stuffing box or packing gland 11 surrounds the piston adjacent the upper, open face of the cylinder 9, so as to provide a sliding sealed connection between the upper end of the cylinder 9 and the periphery of piston 10. Mounted on the upper end of the piston 10 is a lower platen 12, toward and from which the upper platen 8 moves in the opening and closing of the press.

A pair of mating or complementary mold sections 13 and 14 is disposed between the platens 8 and 12, the mold section 13 being secured to the underface of the platen 8 and the other mold section 14 being secured to the lower platen 12. The mold sections 13 and 14 have, between their abutting faces, a mold cavity 15 in which a molded article may be formed and cured as usual in this type of molding press. When the press opens, the upper platen 8 moves upwardly and to one side, which separates the mold sections. When the press closes, the upper platen 8 moves into a position above the lower platen, and then the toggle action forces the mold sections together, during which the platen 8 and the upper mold section 13 descend.

The lower end of the cylinder 9 has an inlet port 16 in which a pipe 17 is connected. Pipe 17 leads to a valve 18 and the other side of the valve leads to the outlet side of a hydraulic pump 19. This pump 19 is secured upon a flange 20 upon a base 1 and has an upright cylinder 21, open at its upper end. The piston 22 reciprocates in the upper end of the cylinder 21. The upper end of the piston 22 is pivotally connected by a pivot pin 23 to a hand lever 24. One end of the hand lever 24 is connected by a pivot pin 25 to one end of a link 26. The other end of link 26 is connected by a pivot pin 27 to a bearing bracket 28 extending laterally from the upper end of the housing of the pump 19. The other end of the lever extends outwardly beyond pin 23 to a greater distance than that between pivot pins 23 and 25 so as to serve as a relatively long operating handle for this pump.

The lower end of the cylinder 21 opens into a passage 29 which contains a ball check valve 30 and then leads to the valve 18. When the handle 24 is operated upwardly and downwardly, it forces liquid through the outlet 29 past check valve 30, through valve 18 and pipe 17 into the cylinder 9. A reservoir 31, Fig. 1 is disposed at one side of the hand pump, and a passage 32 having therein a check valve 33 connects the bottom of the reservoir to the lower end of cylinder 21. Thus, when the piston 22 rises, it draws liquid from the reservoir past the check valve 33 into the cylinder 21 to occupy the space vacated by the rising piston.

When the handle 24 is forced downwardly, the check valve 33 closes and the liquid in the cylinder 21, which is placed under pressure, is forced past the check valve 30 into cylinder 9 to build up a pressure therein which will elevate the piston 10. When the piston has been elevated to the desired height, operation of the hand pump is stopped and the valve 18 closed. This prevents the escape of operating liquid from the cylinder 9, and thus the lower plate 12 is held hydraulically in the desired elevation into which it has been moved by liquid pressure delivered from the hand pump 19. Liquids are only slightly compressible and when the upper platen 8 moves downwardly in the closing of the press, the mold sections 13 and 14 will be clamped together with just the desired degree of pressure.

When the press is opened, such as by the upward movement of the plate 8, the confined liquid in the cylinder 9 will tend to advance the lower platen 12, but since the liquid in cylinder 9 is only slightly compressible, there will be only a relatively small upward movement of the lower plate 12 as the pressure on the liquid in cylinder 9 is released. As soon as the mold sections are again brought together, the lower platen 12 will be forced downwardly to its initial position, which will again place the liquid in cylinder 9 under the same holding hydraulic pressure to which it was previously subjected. It will be noted that further operation of the hand pump is unnecessary, except to replace leakage of liquid, until one desires to reset the lower platen 12 at a different height when using different mold sections. A by-pass pipe 17a, controlled by a valve 18a connects pipe 17 directly to reservoir 31 so that when one desires to set the lower platen 12 to a lower position, liquid may be released from cylinder 9 directly to the reservoir, merely by operating valve 18a.

In order to ascertain when there has been substantial leakage of liquid from cylinder 9, a pressure gage 34 is connected by a tube 35 to the pipe 17, so that the gage 34 will at all times indicate the pressure of the liquid in cylinder 9. When the press is closed, one may quickly ascertain by an inspection of gage 34 whether there has been any loss in hydraulic pressure. If there has been a loss, the valve 18 is opened and the hand pump operated to force additional liquid into cylinder 9 and build up the pressure of liquid therein to the desired extent. The valve 17 is then closed.

In operation, the mold sections 13 and 14 are first mounted on the platens 8 and 12 respectively, and the toggle straightened out. The valve 18 is then opened and the hand pump 19 operated to advance hydraulically the piston 10 and lower platen 12 until the mold sections 13 and 14 meet and have the desired pressure between them, as indicated on the gage 34. When the required or desired pressure on the lower platen 12 has been developed in this manner, the valve 18 is closed. The press is then ready for operation in the usual manner. This provides relatively simple means for adjustment of the molds of any thickness into the desired, operative relationship, up to the allowable stroke of the ram formed of the cylinder 9 and piston 10 and establishes predetermined pressure between the mold sections.

When the press is opened by means of the toggle mechanism, the hydraulic pressure will immediately drop to zero and the lower platen will actually advance a very slight amount such, for example, as 10 or 15 thousandths of an inch, due to the slight compressibility of the liquid in the cylinder and the stretch in the press itself. When the press is reloaded and the toggle again closed, the toggle mechanism itself develops pressure on the mold sections and in the hydraulic cylinder 9. The force to create this pressure is thus obtained from the toggle mechanism.

In some instances it may be desired to have a little greater advance of the platen 12 when the pressure thereon is released by the opening of the press and to compensate for leakage. A small accumulator may be connected to the cylinder 9 and give a desired amount of advance to the ram when the pressure is removed. While various spring-loaded plungers, air-loaded cylinders, weight-loaded accumulators or other means of storing fluids under pressure may be connected to cylinder 9, a very simple and suitable type of such an accumulator 36 is illustrated in the drawings as connected to the cylinder 9 independently of the pump. The accumulator 36, illustrated in Fig. 2 of the drawings, is connected at its lower end by a pipe 37 to a port opening into the cylinder 9.

This type of accumulator 36 is available in the open market where it is identified as a Greer accumulator and is marketed by Greer Hydraulics Inc. of Brooklyn, N. Y. It is known as the bag-separator type of accumulator, employing a shell 39 which is closed except where it is connected to the pipe 37. Within the shell 36 is a rubber bag or separator 40, shown in dash lines in Fig. 2. Provided on the lower end of the bag 40 is a button 41 which moves into and out of contact with a valve seat in the opening from the shell 39 into pipe 37 as the pressure in shell 39 varies. A valved inlet 42 couples the upper end of the bag to the interior of the shell 39 and also serves as a passage by which air may be admitted to the interior of the rubber bag. The bag is thus fully closed, and when liquid is forced into the shell 39 from the cylinder 9, it surrounds the bag 40 on all sides and compresses it, and thus compresses the air or gas within the bag 40.

When pressure in cylinder 9 is released, the compressed air in the bag expands and forces liquid from shell 39 back into the cylinder 9, until the bag expands enough to seat the button 41 in its valve seat and close further escape of liquid from the shell 39. This accumulator thus makes available a desired amount of operating liquid under pressure to replace any leakage in the cylinder 9, and yet the amount available is limited to provide for only a definite movement of the piston 10 as pressure in cylinder 9 is released.

In using such an accumulator, the hand pump will, of course, be used during the initial setup period to develop the pressure in the press cylinder and to store pressure in the accumulator, such as by compressing the gas in the bag 40. The valve 18 is then closed. When the press toggle is opened up, the accumulator will be discharged and the piston 10 and the platen 12 will advance upwardly a proportionate amount, usually only a few thousandths of an inch extra, depending on the volumetric capacity of the accumulator. When the press recloses, the accumulator will be recharged with fluid forced back into it by the downward travel of the piston 10. The advantage in using an accumulator in this manner is that it compensates automatically for any slight leakage of liquid from the hydraulic cylinder 9. Without an accumulator, leakage would cause a very definite drop in pressure, so that the operator would be obliged to keep an accurate check on the pressure in the cylinder 9, as indicated on the pressure gage 34, which is developed by the toggle as the toggle straightens out. By using the accumulator to compensate for any small leakage, it is unnecessary to watch the pressure as closely.

It will be noted that no separate source of hydraulic pressure is required, such as from a motor driven pump or from a central hydraulic pressure system. Signals controlled by pressure-operated switches which are responsive to pressure in the cylinder 9 may, when desired, be used to give an alarm whenever the pressure is below a deisred limit and the press is closed, but inasmuch as such alarm systems are well known for various purposes, they have been omitted from the drawings in the interest of brevity and clarity.

In the modification of the invention illustrated in Fig. 3, a rubber bottle or bladder 43 is disposed in the bottom of cylinder 9 and the interior of this bottle or bladder is connected to the pipe 17. When operating liquid under pressure is forced into the bottle or bladder, it expands and forces upwardly the piston 10. The internal pressure in the bottle exerts the same pressure on the end of piston 10 as would the same liquid if it were injected into the cylinder, and is satisfactory for a short work stroke of the piston 10. Its use eliminates the necessity of ram sealing or packing, so that the stuffing box or gland 11 may be omitted. This greatly reduces the possibility of leakage which would require replenishment. With a construction such as shown in Fig. 3, an accumulator is not usually necessary merely to offset the possibility of leakage, but when used, and its use is preferable, the accumulator is connected to the pipe 17 between valve 18 and the inlet to the bottle.

An important advantage of an accumulator such as 36, is that it does give a definite follow-up pressure which is required during many molding operations. Assume, for instance, that in the molding of some plastic material where heat must be applied to the material under pressure for some period of time before the material will flow out satisfactorily to fill the mold cavity. Without such a fluid cushion built into the base of the press, and without an accumulator to give a follow-up stroke, such material could not be molded. The toggle would not develop anywhere near the full, required pressure unless it was practically straightened out, and once it was straightened out, then there would be no means to give a follow-up stroke to flow the material as it did soften. Contrariwise, the toggle could be straightened out to develop the full pressure as determined by the loading of an accumulator and as the material softened and flowed, the accumulator would discharge in order to provide further advancement of the cushion ram under full pressure.

The gas end of the accumulator 36 is usually connected to a gas bottle, such as a bottle of nitrogen, and with a relatively large volume of gas backing up the accumulator, the hydraulic pressure varies little between full storage volume and zero storage volume.

It should be noted that the toggle mechanism is used to actually develop the hydraulic pressure which is applied to the opposing ram, and no other source of hydraulic pressure is necessary except to replace leakage losses.

It will be understood that various changes in the details and arrangements of parts, which have been herein described and illustrated in order to explain the nature of the invention, may be made by those skilled in the art within the principle and scope of the invention as expressed in the appended claim.

We claim:

A molding press of the mechanically closing type, comprising a pair of superposed, separable, complementary mold sections, mechanical means supporting the upper mold section, and forcibly and positively lowering it into closed position and then lifting it to open position, a platen supporting the lower mold section for vertical movement therewith, a piston depending from said platen, a cylinder having a pressure chamber with an open upper end into which said piston descends and in which it has a sealed sliding fit, said chamber being closed by said piston, said piston being free to move upwardly and downwardly beyond closed mold position under the force of liquid in said chamber, a liquid substantially filling said chamber below said piston, means for adding liquid to that in said chamber in an amount just sufficient to elevate the piston, while the upper mold section is in open position, to a desired position just above its closed mold position but spaced below the lifted, upper mold section, with the weight of the piston, platen and lower mold section approximately balancing the pressure on the confined liquid in said cylinder chamber, an accumulator having a closed cavity connected to said cylinder chamber with a valve seat in its connection to said chamber, a shiftable partition in said cavity with a valve element movable against said seat after a selected movement of said partition toward said seat, and a measured amount of gas on the opposite side of said partition from said seat, which is compressed by pressure of said liquid on said partition and which urges said liquid from said cavity into said cylinder until said valve element engages with said seat.

References Cited in the file of this patent

UNITED STATES PATENTS

| | | |
|---|---|---|
| 175,284 | Hitchcock | Mar. 28, 1876 |
| 1,774,614 | Rode | Sept. 2, 1930 |
| 1,984,768 | Shook | Dec. 18, 1934 |
| 2,020,669 | Williams | Nov. 12, 1935 |
| 2,083,676 | Vinal | June 15, 1937 |
| 2,304,141 | Bergmann | Dec. 8, 1942 |
| 2,338,280 | Brundage | Jan. 4, 1944 |
| 2,608,721 | Heinzelman | Sept. 2, 1952 |